(12) United States Patent
Soane et al.

(10) Patent No.: US 7,820,563 B2
(45) Date of Patent: Oct. 26, 2010

(54) COMPOSITIONS AND METHODS FOR IMPARTING OIL REPELLENCY AND/OR WATER REPELLENCY

(75) Inventors: David S. Soane, Chestnut Hill, MA (US); Michael C. Berg, Baltimore, MD (US); William A. Mowers, Oldsmar, FL (US)

(73) Assignee: Hawaii Nanosciences, LLC, Cambridge, MA (US)

( * ) Notice: Subject to any disclaimer, the term of this patent is extended or adjusted under 35 U.S.C. 154(b) by 13 days.

(21) Appl. No.: 12/424,620

(22) Filed: Apr. 16, 2009
(Under 37 CFR 1.47)

(65) Prior Publication Data
US 2010/0068960 A1 Mar. 18, 2010

Related U.S. Application Data

(63) Continuation of application No. PCT/US2006/041564, filed on Oct. 23, 2006.

(51) Int. Cl.
*B32B 27/04* (2006.01)
(52) U.S. Cl. .......................... 442/81; 442/80; 428/446; 428/452
(58) Field of Classification Search .............. 442/80–81
See application file for complete search history.

(56) References Cited

U.S. PATENT DOCUMENTS

| | | |
|---|---|---|
| 2,826,551 A | 3/1958 | Geen et al. |
| 3,545,909 A | 12/1970 | Gagliardi |
| 3,567,680 A | 3/1971 | Iannicelli |
| 3,964,500 A | 6/1976 | Drakoff |
| 4,035,307 A | 7/1977 | Fry et al. |
| 4,049,557 A | 9/1977 | Wixon |
| 4,076,633 A | 2/1978 | Edwards et al. |
| 4,084,983 A | 4/1978 | Bernhard et al. |
| 4,102,738 A | 7/1978 | Dzurik |
| 4,136,250 A | 1/1979 | Mueller et al. |
| 4,139,513 A | 2/1979 | Tanaka et al. |
| 4,142,724 A | 3/1979 | Reick |
| 4,151,154 A | 4/1979 | Berger |
| 4,199,142 A | 4/1980 | Reick |
| 4,234,627 A | 11/1980 | Schilling |
| 4,246,389 A | 1/1981 | LeBoeuf |
| 4,246,423 A | 1/1981 | Martin |
| 4,251,282 A | 2/1981 | Vahlensieck et al. |
| 4,260,540 A | 4/1981 | Rolf et al. |
| 4,260,725 A | 4/1981 | Keogh et al. |
| 4,293,611 A | 10/1981 | Martin |
| 4,299,817 A | 11/1981 | Hannan et al. |
| 4,309,480 A | 1/1982 | Armanini |
| 4,377,518 A | 3/1983 | Vor Der Bruck et al. |
| 4,398,915 A | 8/1983 | Panto et al. |
| 4,402,703 A | 9/1983 | Panto et al. |
| 4,421,657 A | 12/1983 | Allen et al. |
| 4,493,824 A | 1/1985 | Abe |
| 4,543,128 A | 9/1985 | Troesch et al. |
| 4,566,908 A | 1/1986 | Nakatani et al. |
| 4,655,843 A | 4/1987 | Marraccini et al. |
| 4,686,287 A | 8/1987 | Hunger |
| 4,704,272 A | 11/1987 | Oh et al. |
| 4,755,229 A | 7/1988 | Armanini |
| 4,788,006 A | 11/1988 | Bolich, Jr. et al. |
| 4,806,260 A | 2/1989 | Broze et al. |
| 4,851,140 A | 7/1989 | Nuesslein et al. |
| 4,873,293 A | 10/1989 | Brode, II et al. |
| 4,902,499 A | 2/1990 | Bolish, Jr. et al. |
| 4,925,530 A | 5/1990 | Sinclair et al. |
| 4,968,351 A | 11/1990 | Ahmed et al. |
| 5,021,527 A | 6/1991 | Ohmori et al. |
| 5,154,864 A | 10/1992 | Nishiyama et al. |
| 5,164,253 A | 11/1992 | Greak |
| 5,258,458 A | 11/1993 | Allewaert et al. |
| 5,344,489 A | 9/1994 | Matijevic et al. |
| 5,378,574 A | 1/1995 | Winnik et al. |

(Continued)

FOREIGN PATENT DOCUMENTS

| | | |
|---|---|---|
| EP | 0213931 | 3/1987 |
| EP | 0239079 | 9/1987 |
| EP | 0246090 | 11/1987 |
| EP | 286850 | 10/1988 |
| EP | 0325484 | 1/1989 |
| EP | 0524612 | 1/1993 |
| EP | 0812956 | 12/1997 |
| EP | 1402881 | 3/2004 |
| FR | 2831176 | 4/2003 |
| FR | 2831178 | 4/2003 |

(Continued)

OTHER PUBLICATIONS

Azo material Polybutadiene Information Sheet, Oct. 23, 2002.

(Continued)

*Primary Examiner*—Lynda Salvatore
(74) *Attorney, Agent, or Firm*—Nutter McClennen & Fish LLP

(57) ABSTRACT

Compositions and methods for treating substrates, such as fibrous materials, are disclosed. Such compositions and methods can be used to impart or maintain a level of oil repellency and/or water repellency in fibrous substrates such as paper-based materials and/or textiles. In general, such compositions can utilize a copolymer having a plurality of polycationic segments, which can be joined by various other polymeric segments such as silicones and/or hydrophilic polymeric segments. The copolymer can be formulated as a highly-branched polymer, which can have substantivity to a fibrous material to impart oil repellency and/or water repellency. In several instances, the copolymer can be formulated to be fluorine-free. Various details of such copolymers are discussed, as well as methods of utilizing and making such copolymers.

31 Claims, No Drawings

U.S. PATENT DOCUMENTS

| | | | |
|---|---|---|---|
| 5,490,944 | A | 2/1996 | Suazon |
| 5,493,011 | A | 2/1996 | Jung et al. |
| 5,532,059 | A | 7/1996 | Lee |
| 5,656,257 | A | 8/1997 | Fealy et al. |
| 5,712,327 | A | 1/1998 | Chang et al. |
| 5,756,080 | A | 5/1998 | Janchitraponvej et al. |
| 5,760,100 | A | 6/1998 | Nicolson et al. |
| 5,807,956 | A | 9/1998 | Czech |
| 5,827,610 | A | 10/1998 | Ramachandran |
| 5,904,919 | A | 5/1999 | Brautigam et al. |
| 5,925,580 | A | 7/1999 | Midorikawa |
| 5,958,180 | A | 9/1999 | Hubbe et al. |
| 5,998,026 | A | 12/1999 | Ramachandran |
| 6,007,801 | A | 12/1999 | Hossel et al. |
| 6,024,823 | A | 2/2000 | Rubin et al. |
| 6,080,830 | A | 6/2000 | Dirschl et al. |
| 6,096,469 | A | 8/2000 | Anderson et al. |
| 6,113,892 | A | 9/2000 | Newell et al. |
| 6,129,786 | A | 10/2000 | Camara et al. |
| 6,139,688 | A | 10/2000 | Ramachandran |
| 6,156,222 | A | 12/2000 | Jennings et al. |
| 6,159,548 | A | 12/2000 | Moody |
| 6,277,361 | B1 | 8/2001 | Murray |
| 6,335,315 | B1 | 1/2002 | Trinh et al. |
| 6,355,234 | B1 | 3/2002 | Birtwistle et al. |
| 6,358,569 | B1 | 3/2002 | Badyal et al. |
| 6,368,456 | B1 | 4/2002 | Cimecioglu et al. |
| 6,368,584 | B1 | 4/2002 | Garnier et al. |
| 6,379,753 | B1 | 4/2002 | Soane et al. |
| 6,380,336 | B1 | 4/2002 | Soane et al. |
| 6,387,999 | B1 | 5/2002 | Dirschl et al. |
| 6,455,058 | B1 | 9/2002 | Sun et al. |
| 6,472,476 | B1 | 10/2002 | Soane et al. |
| 6,497,732 | B1 | 12/2002 | Soane et al. |
| 6,497,733 | B1 | 12/2002 | Ware, Jr. et al. |
| 6,517,933 | B1 | 2/2003 | Soane et al. |
| 6,544,594 | B2 | 4/2003 | Linford et al. |
| 6,573,234 | B1 | 6/2003 | Sivik et al. |
| 6,582,620 | B2 | 6/2003 | Miyadai et al. |
| 6,596,346 | B2 | 7/2003 | Bernard et al. |
| 6,599,631 | B2 | 7/2003 | Kambe et al. |
| 6,603,054 | B2 | 8/2003 | Chen et al. |
| 6,607,994 | B2 | 8/2003 | Soane et al. |
| 6,617,267 | B2 | 9/2003 | Soane et al. |
| 6,627,183 | B1 | 9/2003 | Young et al. |
| 6,635,702 | B1 | 10/2003 | Schmucker-Castner et al. |
| 6,638,984 | B2 | 10/2003 | Soane et al. |
| 6,649,222 | B1 | 11/2003 | D'Agostino et al. |
| 6,679,924 | B2 | 1/2004 | Ware et al. |
| 6,696,051 | B2 | 2/2004 | Barbuzzi et al. |
| 6,743,936 | B1 | 6/2004 | Wellinghoff et al. |
| 6,756,077 | B2 | 6/2004 | Yu |
| 6,780,497 | B1 | 8/2004 | Walter |
| 6,796,649 | B2 | 9/2004 | Chu et al. |
| 6,808,701 | B2 | 10/2004 | Duden et al. |
| 6,812,276 | B2 | 11/2004 | Yeager |
| 6,818,253 | B2 | 11/2004 | Kimbrell |
| 6,821,509 | B2 | 11/2004 | Soane et al. |
| 6,824,650 | B2 | 11/2004 | Lindsay et al. |
| 6,852,390 | B2 | 2/2005 | Extrand |
| 6,855,772 | B2 | 2/2005 | Linford et al. |
| 6,872,424 | B2 | 3/2005 | Linford et al. |
| 6,881,490 | B2 | 4/2005 | Kambe et al. |
| 6,884,479 | B2 | 4/2005 | Chu et al. |
| 6,884,491 | B2 | 4/2005 | Rubin et al. |
| 6,899,923 | B2 | 5/2005 | Kimbrell, Jr. |
| 6,913,639 | B2 | 7/2005 | Wang et al. |
| 6,916,781 | B2 | 7/2005 | DuVal et al. |
| 6,923,216 | B2 | 8/2005 | Extrand et al. |
| 6,951,962 | B2 | 10/2005 | Bottorff |
| 6,955,844 | B2 | 10/2005 | Tagge et al. |
| 6,956,020 | B2 | 10/2005 | Kvita et al. |
| 6,960,642 | B2 | 11/2005 | Jariwala et al. |
| 6,979,711 | B2 | 12/2005 | Franchina |
| 6,986,886 | B2 | 1/2006 | Hammond et al. |
| 7,074,845 | B2 | 7/2006 | Laleg |
| 7,087,572 | B2 | 8/2006 | Hubig et al. |
| 7,282,263 | B2 | 10/2007 | Rasmusen et al. |
| 2002/0068139 | A1 | 6/2002 | Polak et al. |
| 2002/0149656 | A1 | 10/2002 | Nohr et al. |
| 2003/0104134 | A1 | 6/2003 | Linford et al. |
| 2003/0213410 | A1 | 11/2003 | Adams et al. |
| 2003/0228339 | A1 | 12/2003 | El-Nokaly et al. |
| 2004/0013964 | A1 | 1/2004 | Ogata |
| 2004/0110883 | A1 | 6/2004 | Pakan et al. |
| 2004/0138083 | A1 | 7/2004 | Kimbrell et al. |
| 2005/0038498 | A1 | 2/2005 | Dubrow et al. |
| 2005/0084456 | A1 | 4/2005 | Tang et al. |
| 2005/0170192 | A1 | 8/2005 | Kambe et al. |
| 2005/0181195 | A1 | 8/2005 | Dubrow |
| 2005/0229327 | A1 | 10/2005 | Casella et al. |
| 2006/0183663 | A1 | 8/2006 | Lentsch et al. |
| 2007/0107635 | A1 | 5/2007 | Soane et al. |
| 2007/0108418 | A1 | 5/2007 | Soane et al. |
| 2007/0149650 | A1 | 6/2007 | Masuda |
| 2008/0271865 | A1 | 11/2008 | Soane et al. |
| 2009/0165975 | A1 | 7/2009 | Soane et al. |

FOREIGN PATENT DOCUMENTS

| | | |
|---|---|---|
| FR | 2872412 | 1/2006 |
| FR | 2879097 | 6/2006 |
| GB | 948163 | 1/1964 |
| GB | 2278114 | 11/1994 |
| JP | 63316717 | 12/1988 |
| WO | WO 01/78663 | 10/2001 |
| WO | WO 03/035771 | 5/2003 |
| WO | WO 2004/041942 | 5/2004 |
| WO | WO 2004/063285 | 7/2004 |
| WO | WO 2004/065473 | 8/2004 |
| WO | WO 2005/061627 | 7/2005 |
| WO | WO 2007/021730 | 2/2007 |
| WO | WO 2007/021731 | 2/2007 |
| WO | WO 2007/092450 | 8/2007 |
| WO | WO 2008/057312 | 5/2008 |

OTHER PUBLICATIONS

International Preliminary Examination Report, from PCT/US06/031018, mailed Feb. 12, 2008.

International Search Report, from PCT/US06/031017, mailed Feb. 2, 2007.

International Search Report, from PCT/US07/003159, mailed Sep. 24, 2007.

International Search Report, from PCT/US06/031018, mailed Oct. 1, 2007.

International Search Report, from PCT/US07/022803, mailed May 19, 2008.

Lau, K. et al., "Superhydrophobic carbon nanotube forests," Nano. Lett. 3(12):1701-05 (2003).

Li, H. et al., "Adsorption and Complexation of Chitosan Wet-End Additives in Papermaking Systems," 91 J. Appl. Polymer Sci. 2642-48 (2004).

Li, H. et al., "Effect of Molecular Weight and Degree of Substitution of Quaternary Chitosan on its Adsorption and Flocculation Properties for Potential Retention-Aids in Alkaline Papermaking," 242 Colloids and Surfaces A: Physicochem. Eng. Aspects 1-8 (2004).

McKay et al., "Adsorption of Dyes on Chitin: Equilibrium Studies," J. Applied Polymer sci. 27:3043-4057 (1982).

Morra, M. et al., "Contact angle hysteresis in oxygen plasma treated poly (tetrafluoroethylene)" Langmuir 5(3):872-76 (1989).

Nordell, P., "Wet-Strength Development of Paper," Master of Science Programme, Mechanical Engineering, Lulea Univ. of Technology 2006:023 CIV.

U.S. Appl. No. 60/785,432, publically available on Feb. 22, 2007 along with publication of WO 2007/021730.

U.S. Appl. No. 60/706,852, publically available on Feb. 22, 2007 along with publication of WO 2007/021730.

U.S. Appl. No. 60/706,853, publically available on Feb. 22, 2007 along with publication of WO 2007/021730.

U.S. Appl. No. 60/765,117, publically available on Feb. 22, 2007 along with publication of WO 2007/021730.

U.S. Appl. No. 60/708,415, publically available on Feb. 22, 2007 along with publication of WO 2007/021730.

U.S. Appl. No. 60/712,059, publically available on Feb. 22, 2007 along with publication of WO 2007/021731.

U.S. Appl. No. 60/725,827, publically available on Feb. 22, 2007 along with publication of WO 2007/021731.

Wu et al., "Adsorption of Dyes on Nanosize Modified Silica Particles," J. Colloid and Interface Sci. 195:222-28 (1997).

Zhai, L. et al., "Patterned superhydrophobic surfaces: Toward a synthetic mimic of the namib desert beetle," Nano. Lett. 6(6):1213-17 (2006).

Zhai, L. et al., "Stable superhydrophobic coatings from polyelectrolyte multilayers," Nano Lett. 7:1349 (2004).

COMPOSITIONS AND METHODS FOR IMPARTING OIL REPELLENCY AND/OR WATER REPELLENCY

CROSS-REFERENCE TO RELATED APPLICATIONS

This application is a continuation of PCT Application No. PCT/US2006/041564, filed Oct. 23, 2006, entitled "Compositions and Methods for Imparting Oil Repellency and/or Water Repellency", which is incorporated herein by reference in its entirety.

FIELD OF INVENTION

The technical field of this invention is directed toward compositions that are potentially useful for modifying textiles and other substrates, and more particularly to compositions, and uses of such compositions, to impart oil repellency and/or water repellency to substrates.

BACKGROUND OF THE INVENTION

Various methods and compositions have been proposed for modifying textiles and other fibrous materials to impart oil repellency and/or water repellency. Though a variety of preparations are available, problems with the preparations exist. Some preparations utilize lamination processes to adhere a layer of polymeric material with micropores to a substrate. Such processes require specialized equipment and can be quite expensive to apply. Other processes apply a fluid with a known copolymer to impart repellency properties to a treated fibrous material. Unfortunately, some of these polymer compositions react with fibrous substrates to produce undesirable products such as formaldehyde, leading to environmental and health concerns. Other compositions may react with the fibrous material, resulting in discoloring or degradation in material properties. Still other techniques rely upon compositions that include a fluorocarbon component (e.g., a fluoropolymer) that can aid in imparting repellency properties. Potential concerns regarding the disposition of fluorine in the environment, and its potential effects, have grown in recent years. As a result, the use of fluorocarbon-containing compositions have fallen out of favor with some consumers. Furthermore, some compositions can have a limited lifetime, resulting in a treated fabric loses its augmented repellency properties after a period of use. In such instances, the time and expense of reapplying some existing compositions to retreat the textile can be burdensome if the composition is expensive or requires special conditions or equipment for application.

Accordingly, a need exists for improved methods and compositions that can modify textiles and other fibrous materials and substrates to impart water repellency and/or oil repellency.

SUMMARY OF THE INVENTION

Some embodiments of the invention are directed to a copolymer that can be used to treat a substrate including fibrous materials such as textiles and/or paper-based materials. Such treatment can impart oil repellency, water repellency, or both in a substrate. The copolymers can include polycationic segments, where each of the segments has multiple repeat units that each include at least one amine group. Multiple segments, such as polymeric segments, can be attached to the polycationic segments to form a large copolymer molecule that can be highly-branched, with a high molecular weight (e.g., the copolymer has a molecular weight greater than about 200,000 Daltons). In some embodiments, about 10% to about 40% of the amine groups of a polycationic segment are reacted with another segment, such as a silicone segment (e.g., a silicone segment having multiple functionalities for reacting with amine groups), a hydrophilic segment, or a combination of silicone and hydrophilic segments. In several embodiments, the copolymer is substantially free of fluorine atoms.

In some embodiments, the copolymer includes a plurality of silicone segments. The silicone segments can be attached to one, two, or more distinct polycationic segments. The copolymer can also, or alternatively, include a plurality of hydrophilic segments, where each hydrophilic segment can be attached to one, two, or more distinct polycationic segments. To allow a silicone segment or a hydrophilic segment to attach to a polycationic segment, the silicone segment or hydrophilic segment can be functionalized (e.g., at a terminal end) to allow reaction with an amine group of the polycationic segment.

Polycationic segments that are utilized in copolymer embodiments include aliphatic amine polymer segments, which can include at least one of polyalkyleneimine, polyvinylamine, polyallylamine, polydiallylamine, and copolymers thereof. For example, a polyalkyleneimine segment that is used as part of the copolymer can comprise a repeat unit represented by Structural Formula (Ia):

(Ia)

wherein n is an integer from about 2 to about 10. A1 can be at least one of a hydrogen atom, a silicone segment, and a hydrophilic segment. In some embodiments, n is from about 2 to about 5. In other embodiments, the polyalkyleneimine segment is a polyethyleneimine segment. The polycationic segments can be linear or branched. Branched polycationic segments, such as aliphatic amine polymer segments, can have a degree of branching below a designated value such as about 0.33. The polycationic segments can have an average molecular weight greater than 100,000 Daltons, or the average molecular weight can be in a range between about 10,000 Daltons and 2,000,000 Daltons, or the average molecular weight can be in a range between about 100,000 Daltons and 500,000 Daltons.

Different types of silicone segments can be utilized with the various copolymers consistent with embodiments of the invention. For example, one or more silicone segments can include a polymer segment having a repeat unit represented by Structural Formula (II):

(II)

where each R1 group is independently a hydrocarbyl group containing 1 to 6 carbon atoms, a hydrogen, or a hydroxyl group. In another embodiment, the hydrocarbyl group of R1 can be at least one of an alkyl group with 1 to 4 carbons, phenyl, and vinyl. In another embodiment, each R1 group is independently at least one of hydrogen, phenyl, and methyl. In some embodiments, the silicone segments have an average molecular weight between about 500 Daltons and 10,000 Daltons, or between about 500 Daltons and about 2,000 Daltons. Some embodiments include a plurality of softening segments that are each functionalized to attach to only one polycationic segment. Such single point attached softening segments can impart a softness to a textile material, when the copolymer is applied thereto. In some embodiments, the softening segments include single point attached silicone segments. Such silicone segments can have an average molecular weight greater than about 3,000 Daltons.

Hydrophilic segments that can be utilized with embodiments of the invention include a variety of polymeric segments that can be substantially non-ionic. For instance, the hydrophilic segment can include segments from a monomer comprising at least one of a sugar and a hydroxide group. In some embodiments, the hydrophilic segments include a polymeric segment having a repeat unit of a polyalkylene oxide, such as a polyethylene oxide or polypropylene oxide repeat unit. Hydrophilic segments, such as polyalkylene oxides, can have an average molecular weight between about 300 Daltons and about 100,000 Daltons, or between about 500 Daltons, and about 5,000 Daltons.

Other embodiments of the invention are directed to fibrous-substrate-treating compositions. The compositions can include a polymer mixture comprising one or more of the copolymers disclosed in the present application. Such compositions can be formulated as a textile treating composition (e.g., a laundry detergent and/or a repellency treatment composition), or as a paper-based material treating composition such as a stain repellency composition. The polymer mixture can include an aqueous solvent, a non-aqueous solvent, or a mixture of aqueous and non-aqueous solvents. In some embodiments, such treatment solutions can include one or more other components such as a UV blocker, a dye, an optical brightening agent, a thickener, a deposition agent, a cleansing agent (e.g., a textile cleaning agent), a hindered amine light stabilizer, or a fragrance material. These other components can be separate components from the copolymer, or one or more of the components can bind to a section of the copolymer. For example, a polycationic segment of a copolymer can include a repeat unit having Structural Formula (Ib):

(Ib)

wherein n can be any of the values disclosed for Structural Formula (Ia); and A2 can be at least one of a UV blocker, a dye, an optical brightening agent, a thickener, a deposition agent, a hindered amine light stabilizer, and a fragrance material. Treating compositions can generally include the copolymer in a concentration range from about 1 part per million to about 40% by weight of the entire mixture.

Embodiments of the invention are also directed to treated substrates such as fibrous materials. In general, the treated materials can comprise a fibrous material and a composition that contacts a surface of the fibrous material. The composition can include one or more of the copolymers disclosed in the present application. Accordingly, the treated materials include textile materials such as textiles with enhanced oil repellency and/or water repellency, and paper-based materials such as paper with enhanced stain repellency.

Some embodiments are directed to methods of imparting water repellency and/or oil repellency to a fibrous material such as a textile or a paper-based material. The method includes the step of applying a copolymer to the fibrous material to impart repellency. The copolymer that is applied can be one or more of the copolymers disclosed in the present application. The copolymer can have an affinity for the fibrous material that includes, or does not include, covalent bonding. In the former case, a crosslinking agent can be used to bind the copolymer to the fibrous material.

The copolymer can be applied in a variety of manners. In some embodiments, a polymer mixture, which can be aqueous, non-aqueous, or a combination thereof, is formed with the copolymer. The polymer mixture is contacted with the fibrous material to apply the copolymer thereto. In other embodiments, the copolymer is applied by forming the copolymer in the vicinity of the fibrous substrate. Polycations can be applied to the fibrous material that can have properties consistent with polycationic segments of the copolymer (e.g., a branched polycation such as polyethyleneimine). Subsequently, a mixture including silicone polymers can be introduced, where the silicone polymers can have one or more functionalities for binding to an amine group of one or more polycations. The silicone polymer can be reacted with an amine group to form the copolymer. For example, heat can be introduced to drive the reaction of the amine group with a polymer having a functionality to induce binding. A hydrophilic polymer, consistent with one or more of the properties of hydrophilic segments disclosed herein, can also, or alternatively, be reacted with an amine group of a polycation to cause attachment.

DETAILED DESCRIPTION OF EMBODIMENTS OF THE INVENTION

Embodiments of the invention are directed to methods and compositions for enhancing the water and/or oil repellency of substrates including fibrous materials such as textiles and paper-based materials. Some embodiments include the use of a polymer that can be exposed to a fibrous material to augment the intrinsic repellency properties of the fibrous material. Such embodiments include polymers that are dispersible in an aqueous solution (e.g., the polymers do not form an emulsion). As a result, some of these polymers can be mixed as a component of a laundry detergent or other textile cleaning composition, allowing for convenient, consumer application of the polymer to a piece of clothing, for example, to help impart and/or maintain a desired level of water and/or oil repellency. In such formulations, the polymer can be synthesized to act as a repellency augmenter, not as a cleansing component. Polymers within the scope of some embodiments can also be applied to paper-based products to impart and maintain a level of stain repellency in such products. Other polymers, in accord with embodiments of the invention, can be delivered in a non-aqueous solution or a mixture of aqueous and non-aqueous solutions. Furthermore, the treatment components (e.g., the polymer) can be chosen such that they do not react with the fibrous material, thus alleviating problems associated with creating potential environmental/health hazards. For example, the compositions disclosed herein can be formulated to be substantially fluorine-free. As well, in some embodiments, the compositions can be easily synthesized using commercially-available starting materials, avoiding excessive costs of requiring expensive chemical precursors and/or manufacturing equipment.

As utilized in the present application, the phrases "oil repellency" and "water repellency" refer to a tendency to repel organic and aqueous solutions, respectively. Accordingly, oil/water repellency can include stain repellency, where the staining agent can be either aqueous-based and/or organically-based. In some embodiments discussed herein, a composition can be applied to a fibrous substrate such that the oil and/or water repellency of the substrate is enhanced relative to the substrate in an untreated state. Furthermore, in some embodiments, such enhancement can be imparted and/or maintained while maintaining a designated level of gas permeability through the fibrous substrate. For example, the treated fibrous substrate allows gas permeation that is comparable (e.g., at least about 25%) to the gas permeability of the untreated fibrous substrate, while having enhanced oil repellency and/or water repellency.

As utilized within the present application, the term "polymer" refers to a molecule comprising a plurality of repeat units or monomers. A polymer can comprise one or more distinct repeat units. For example, a "copolymer" refers to a polymer having two or more distinct repeat units. Repeat units can be arranged in a variety of manners. For example, a homopolymer refers to a polymer with one type of repeat unit where the repeat units are adjacently connected. In another example, a plurality of different repeat units can be assembled as a copolymer. If A represents one repeat unit and B represents another repeat unit, copolymers can be represented as blocks of joined units (e.g., A-A-A-A-A-A . . . B-B-B-B-B-B . . . ) or interstitially spaced units (e.g., A-B-A-B-A-B . . . or A-A-B-A-A-B-A-A-B . . . ), or randomly arranged units. Of course, these representations can be made with 3 or more types of repeat units as well. In general, polymers (e.g., homopolymers or copolymers) include macromolecules in a broad range of configurations (e.g., cross-linked, linear, and/or branched). A "highly-branched polymer" refers to a branched and/or cross-linked polymer where the molecule has a tendency to form a three-dimensional space filling structure. For example, a highly-branched polymer can have a configuration where the ratio of the number of branches with each of its ends connected to cross-linkages and/or branch points to the number of branches having a free end is greater than some designated value (e.g., greater than about 0.5, 0.6, 0.7, 0.8, 0.9, 1.0, 1.50, 2.0, or 5.0). The polymer can be disposed in a variety of mixture dispositions such as solutions, melts, and/or gels. A gel refers to a state where a mixture of polymer and liquid has at least some properties that make the mixture behave more like a solid than a viscous liquid (e.g., the mixture exhibits elasticity). Various embodiments described herein are directed to compositions, or use thereof, that include a polymer having one or more of the specific properties discussed above.

As utilized in the present application, the term "segment" refers to a portion of a copolymer molecule. In many instances, the segments can be polymeric segments (i.e., portions or the entirety of a polymer) that are reacted with other segments to form the copolymer molecule.

Copolymers for Modifying Oil Repellency and/or Water Repellency

Some illustrative embodiments are directed to a copolymer that can be applied to a substrate (e.g., a textile or other fibrous material) to impart and/or maintain a degree of water repellency and/or oil repellency. The copolymers of these embodiments can be substantially free of fluorine, though this is not a requirement. The copolymer can comprise a plurality of polycationic segments. Each polycationic segment can be at least a portion of a polymer having a plurality of repeat units, with each repeat unit including at least one amine group. It is understood, however, that a multiplicity of amine groups associated with a repeat unit can also be used. Polycationic segments can be bound to a plurality of other types of segments, as revealed in the present application, to form the copolymer. In general, copolymers within the scope of the illustrative embodiments are capable of enhancing at least one of the oil repellency and water repellency of a fibrous substrate to which the copolymer is applied. In some instances, the copolymer enhances the water repellency more than the oil repellency.

In some embodiments, the copolymer can comprise a plurality of polycationic segments, in various forms as disclosed throughout the present application, and a plurality of silicone segments, such as a plurality of portions of one or more types of silicone polymers. Each silicone segment can be attached (e.g., bonded) to at least one polycationic segment. For example, each of the silicon segments can be attached to a polycationic segment at an amine group of the polycationic segment.

In some particular embodiments, each silicone segment can be attached to at least two distinct polycationic segments (i.e., each polycationic segment has a distinct backbone relative the other polycationic segments). The latter embodiments can promote the formation of a highly-branched copolymer molecule, with the silicone segments acting as hydrophobic connectors between the polycationic segments. Though the copolymer can take on any molecular weight value, in some embodiments the average molecular weight of the copolymer can be large when the copolymer forms a highly-branched structure. For example, the average molecular weight of a copolymer can be greater than about 200,000 Daltons, greater than about 750,000 Daltons, greater than about 1,000,000 Daltons, or greater than about 3,000,000 Daltons. Without necessarily being bound by any particular theory, it is believed that larger molecular weight copolymers can generally provide better oil repellency relative to smaller molecular weight copolymers.

Measurement of the average molecular weights for any polymer discussed herein can be with respect to a number of bases. For example, can be number averaged, weight averaged, or averaged based on some other weighting factors. As well, the techniques utilized to determine molecular weight can include the range of those known to those skilled in the art. Examples include gel permeation chromatography and light-scattering.

Without necessarily being bound by theory, it is believed that when synthetic or natural fibers are contacted with a copolymer mixture, consistent with embodiments described herein, the polycationic segments tend to assemble onto the fiber surface through electrostatic interactions. For example, when the polycationic segment includes a portion of a polyalkyleneimine, the residual charge density of the amine groups on the backbone are conjectured to interact with the fiber surface, and induce assemblage thereon. In some instances, it is believed that the polycationic segments can form crystalline-like domains, which can substantially improve the affinity between the copolymer and a fiber surface. Furthermore, it is believed that copolymers can be in the form of a highly-branched copolymer molecule, which can be readily deposited from a copolymer mixture to a fibrous substrate surface, thereby providing additional stability/affinity for the copolymer on the surface.

Again, without limiting the scope of the present invention, it is believed that the silicone segments can impart desirable water repellency and/or oil repellency properties. As well, it is believed that the silicone segments can improve the copolymer's tendency to exhaust from a mixture (i.e., lower concentrations of polymer in the polymer mixture can be utilized to treat a fibrous material when the polymer is soluble in the mixture but close to coming out of solution).

While the previous discussion refers to the use of electrostatic interactions to provide affinity between the copolymer and a fibrous material, some embodiments can alternatively, or in addition, utilize covalent bonding between the copolymer and fibrous material. For instance, the copolymer can be covalently crosslinked to the fibrous material to enhance the durability of the modification induced by the copolymer. Use of cross-linking agents such as diepoxides, multiepoxides, anhydrides, di-isocynates, and other agents known to those skilled in the art can be used to provide the desired crosslinking between the polymer and the fibrous material. Such embodiments can be use to provide a treatment of a fibrous material (or a treated fibrous material) that can be longer lasting relative to relying solely on adhesion due to electrostatic interactions.

A variety of polycationic segments can be utilized with various embodiments that include one or more of the copolymers described herein. Polycationic segments can be naturally occurring macromolecules with amine groups such as chitosan, or various types of synthetic polymers (e.g., copolymers) bearing amine groups. In some embodiments, the plurality of polycationic segments can include one or more aliphatic amine polymer segments. Aliphatic amine polymers include aliphatic polymers having one or more amine groups in each of a repeat unit of the polymer. Non-limiting examples of aliphatic amine polymers include polyalkyleneimine, polyvinylamine, polyallylamine, and polydiallylamine. Aliphatic amine polymers can also include copolymers having repeat units of different types of aliphatic amine homopolymers, such as copolymer utilizing repeat units of the examples of aliphatic amine polymers.

Consistent with embodiments disclosed herein, polycationic species bearing a multiplicity of secondary amines (e.g., polyalkyleneimines) can be reacted with other segments at the secondary amine locations to connect distinct polycationic segments. This can help promote formation of a highly-branched copolymer molecule. It is understood, however, that some segments, such as silicone segments and hydrophilic segments, can form loops along a single polycationic segment of the copolymers as well. Though the presence of secondary amines can promote the formation of copolymers consistent with embodiments disclosed herein, it is generally understood that the amine groups of a polycationic segment can include primary, secondary, tertiary, or quaternary amines. For example, the presence of some quaternary amine groups can help promote dispersion of a copolymer in an aqueous solvent.

For embodiments utilizing a polyalkyleneimine segment, the segment can include a repeat unit having Structural Formula (Ia):

(Ia)

where n is an integer from about 2 to about 10. Alternatively, n can be an integer from about 2 to about 5. In another alternative, Structural Formula (Ia) is a repeat unit for a polyethyleneimine (i.e., n is 2). A1 can be at least one of a hydrogen atom, a silicone segment, a hydrophilic segment, a UV blocker, a dye, an optical brightening agent, a thickener, a deposition agent, a hindered amine light stabilizer, and a fragrance material. In a particular embodiment, A1 can be at least one of a hydrogen atom, a silicone segment, and a hydrophilic segment. In another particular embodiment, A1 can be at least one of a hydrogen atom and a silicone segment.

Polycationic segments employed with various embodiments can have a variety of molecular weights and molecular weight ranges. In general, a desirable molecular weight range for the polycationic segments is large enough to promote branch formation of the copolymer and small enough such that the polycationic segment can be dispersed in a solvent without undue effort. For example, in some embodiments, the polycationic segments (e.g., polyalkyleneimines such as polyethyleneimine) can have an average molecular weight greater than about 100,000 Daltons. In some other embodiments, the polycationic segments (e.g., polyalkyleneimines such as polyethyleneimine) have an average molecular weight between about 10,000 Daltons and about 2,000,000 Daltons, or between about 100,000 Daltons and about 500,000 Daltons.

Generally, polycationic segments (e.g., polyalkyleneimine segments such as polyethyleneimine) can be either linear or branched to various degrees. In some embodiments, the polycationic segment has a degree of branching in a particular range. The degree of branching along a linear backbone portion of a polymer is defined herein as the number of branching side chains coming off that linear backbone portion divided by the total number of possible branches that can potentially come off that linear backbone portion. Accordingly, the degree of branching is a value between 0 and 1, with 0 corresponding to the portion being completely linear and 1 corresponding to the portion being completely substituted with side branches. Herein, the degree of branching can be with respect to any chosen linear portion of a polymer segment (e.g., the longest linear portion of a branched polymer segment). As well, when referring to the degree of branching off a polymer segment herein, the branching is measured with respect to the number of branches that are of the same character as the polymer segment. For example, in calculating the degree of branching of a polycationic segment, side chains connected to the segment that are of a different chemical nature, such as a silicone segment or a hydrophilic segment, are not considered.

In some embodiments, copolymers having polycationic segments with low degrees of branching are employed. For example, a plurality of the polycationic segments (e.g., polyalkyleneimines such as polyethyleneimine) have a degree of branching lower than about 0.33, or lower than about 0.10, or lower than about 0.05, or lower than about 0.01. In one embodiment, the polycationic segment is approximately or substantially linear, i.e., the degree of branching approaches zero. The degree of branching can be with respect to any linear branch of a branched polycationic segment such as the longest linear branch. Without being bound by theory, it is believed that polycationic segments that are more linear can improve the affinity of the copolymer for a fiber surface by promoting the tendency for the copolymer to form crystalline domains. As well, more branched polycationic segments can result in segment conformations that decrease the accessibility of silicone segments, and other copolymer components, to reach amine groups of the polycationic segment for reaction and binding. As a result, the overall branching of the copolymer can be decreased, resulting in potentially less affinity and/or stability of the copolymer with a fiber surface when the formed copolymer is delivered as a mixture to the fiber surface.

Within the scope of some embodiments of the invention, different types of silicone segments can be utilized with the copolymers discussed herein. In some embodiments, a silicone segment can be a polymeric segment. Such polymeric segments can include a repeat unit represented by Structural Formula (II):

where each R1 in Structural Formula (II) is independently a substituted or unsubstituted hydrocarbyl group, a hydrogen, or a hydroxyl group. Hydrocarbyl groups that can be utilized include both aliphatic and aromatic groups that can be optionally substituted with another aliphatic functionality and/or a heteroatom functionality (e.g., any combination of sulfur, oxygen, or nitrogen). Hydrocarbyl groups can include any number of carbon atoms such as 1 to 10 carbon atoms. Non-limiting examples of hydrocarbyl groups include a vinyl group; a substituted or unsubstituted phenyl group, such as unsubstituted phenyl and phenyl substituted at one or more positions with methyl, ethyl, or propyl; and substituted or unsubstituted alkyl groups, such as alkyl groups with 1 to 4 carbons, or more particularly methyl or ethyl. Accordingly, in some embodiments, each R1 can independently be a hydrocarbyl group containing 1 to 10 carbon atoms, a hydrogen, or a hydroxyl group; or each R1 can independently be an alkyl group with 1 to 4 carbon atoms, phenyl, vinyl, or hydrogen; or each R1 can independently be hydrogen, phenyl, or methyl. In a particular embodiment, the silicone segments can include one or more polydimethylsiloxane ("PDMS") segments.

Generally, the silicone segments can include one or more functional groups for reacting with a portion of a polycationic segment to produce attachment during copolymer synthesis. Such functional group(s) can be located at a terminal end of a silicone segment, or in the neighborhood of a terminal end, or anywhere within the silicone segment. In one embodiment, a silicone segment can include an amine-reacting functionality at each of two terminal ends of the silicone segment. Such a segment can be used to attach each of the functionalized ends to a distinct polycationic segment, which can be beneficial for forming a highly-branched copolymer molecule. Other silicone segment embodiments can utilize three or more functional groups such that a silicone segment can bind in more than two places with one or more polycationic segments.

The chemical nature of the functional group of a silicone segment can be selected to allow reaction between the functional group and a site on a polycationic segment. In some embodiments, the functional group is selected to allow reaction with an amine group of a polycationic segment. Non-limiting examples of such functional groups include epoxides, isocynates, alkyl halides (e.g., methylchloryls), anhydrides, and other amine-reacting functional groups known to those skilled in the art.

The silicone segments, which can be used with copolymers consistent with embodiments revealed in the present application, can span a variety of sizes and structures. For instance, the silicone segments can be branched or linear, and can have a variety of molecular weights. In general, the molecular weight of the silicone segments can be selected to alter the end properties of the copolymer (e.g., ability to exhaust from a mixture; ability to impart oil and/or water repellency with a particular fibrous substrate). In some embodiments, the average molecular weight of the silicone segments (e.g., PDMS segments) is between about 500 Daltons and about 10,000 Daltons, or between about 500 Daltons and 2,000 Daltons.

In some particular embodiments, the copolymer includes a plurality of monofunctionalized softening segments, which can be attached at the functionalization location to a polycationic segment (e.g., at an amine group of the polycationic segment). Copolymers that are consistent with these embodiments can be utilized in a textile-treating formulation such as a laundry detergent. The presence of the monofunctionalized softening segments can help impart an enhanced "softness" quality to treated textiles. Softening segments include polymeric segments that have a low $T_g$ (e.g., polymeric segments with a $T_g$ lower than about 30° C., or lower than the polycationic segments). Examples of softening segments include rubbers such as polyisoprene, and monofunctionalized silicone segments. Types of silicone segments and functionalities that can be used in these embodiments include the silicone segments and functionalities previously described. In one particular embodiment, the silicone segments (e.g., PDMS segments) utilized have an average molecular weight greater than about 3,000 Daltons. In general, the use of monofunctionalized softening segments does not affect the enhancement of water repellency that the copolymer imparts to a fibrous substrate. The enhanced oil repellency imparted by the copolymer, however, can be decreased if the proportion of monofunctionalized softening segments to multifunctionalized silicone segments is too large.

For the various copolymers revealed within the present application, embodiments including the copolymer can comprise a plurality of hydrophilic segments. For example, the copolymer can comprise a plurality of polycationic segments, which can have any of the properties of the polycationic segments revealed in the present application, along with the hydrophilic segments. In a particular embodiment, the copolymer comprises a plurality of polycationic segments and multiple silicone segments, the segments having any of the properties revealed in the present application, and the plurality of hydrophilic segments. Each hydrophilic segment can be attached to one, two, or more distinct polycationic segments, for example at an amine group of the polycationic segment. When the hydrophilic segment is selected to allow attachment to two or more distinct polycationic segments, the hydrophilic segment can aid in branching of the copolymer. Accordingly, the average molecular weight of such copolymers can be greater than about 200,000 Daltons, about 750,000 Daltons, about 1,000,000 Daltons, or about 3,000,000 Daltons. Without necessarily being bound to any particular theory, it is believed that the presence of the hydrophilic segments can aid in the solubility and disperibility of the copolymer in aqueous solutions. As well, it is believed that the hydrophilic segments can also aid in enhancing oil repellency properties of the copolymer.

The types of hydrophilic segments that can be utilized include, typically, polymeric segments that enhance the dispersibility of the copolymer in aqueous mixtures. For instance, the hydrophilic segments can be substantially nonionic, having limited charge or substantially no charge, such as to limit interference with the polycationic segments. Non-limiting examples of hydrophilic segments include sugar-based polymers such as hydroxypropyl cellulose, dextran polymers and their derivatives, and other polysaccharides or carbohydrates; polyethers such as polyalkylene oxides like polypropylene oxide and polyethylene oxide; polymers having hydroxide containing repeat units such as polyvinyl alcohol; polyvinyl pyrrolidone; and other polymer segments with the desired properties as known to those skilled in the art. In some embodiments, hydrophilic segments can include copolymers with one or more repeat units that are utilized in a sugar-based polymer and/or a polyether.

In some embodiments, the hydrophilic segments include repeat units from a polyether, or the segments are substantially one or more polyether segments. In some particular embodiments, the polyethers include a polyalkylene oxide based polymer. Such a polymer can include repeat units represented by Structural Formula (III):

where each R2 is independently a hydrogen, or a substituted or unsubstituted aliphatic group. Potential substitutions include another aliphatic functionality and/or a heteroatom functionality. In some embodiments, each R2 is independently a hydrogen, or an optionally substituted saturated aliphatic group with 1 to 6 carbon atoms, or 1 to 3 carbon atoms. In one particular embodiment, each R2 is independently a hydrogen or a methyl. For example, the hydrophilic segment can comprise a polyethylene oxide segment, a polypropylene oxide segment, or a copolymer having a mixture of both segments.

Generally, the hydrophilic segments can include one or more functional groups for reacting with a portion of a polycationic segment to produce attachment during copolymer synthesis. Such functional group(s) can be located at a terminal end of a hydrophilic segment, or in the neighborhood of a terminal end, or anywhere within the hydrophilic segment. In one embodiment, the functionality is an amine-reacting functionality at one or two terminal ends of the hydrophilic segment. Hydrophilic segments with two amine-connecting functionalities can be used to attach each of the functionalized locations to two distinct polycationic segments, which can enhance copolymer branching. Of course, more than two functionalities per hydrophilic segment can be used.

Functionalizations for hydrophilic segments typically are selected to allow attachment of the hydrophilic segment to a polycationic segment (e.g., an amine-reacting functionalization).

Non-limiting examples of such functional groups include epoxides, isocynates, alkyl halides (e.g., methylchloryls), anhydrides, and other amine-reacting functional groups known to those skilled in the art.

Hydrophilic segments embodied as polymer segments can include polymer segments that are linear or branched to various degrees. Hydrophilic segments can also have a variety of molecular weights. In some embodiments, the molecular weights are selected to promote copolymer solubility in aqueous mixtures and/or oil/water repellency. For example, hydrophilic segments (e.g., polypropylene oxide or polyethylene oxide) can have an average molecular weight between about 300 Daltons and 100,000 Daltons, and between about 500 Daltons and about 5,000 Daltons.

Copolymers can be formulated such that a proportion of amine groups associated with a plurality of polycationic segments are bound to selected substituents. Though the proportion of amine groups that are bound to selected substituents can be any percentage, in some embodiments the proportion of amine groups reacted are sufficient such that the copolymer can provide at least one of enhanced oil repellency and water repellency to a treated substrate (e.g., textile and/or paper-based material). For example, the proportion of amine groups can be greater than about 5%, 10%, 15%, 20%, 25%, 30%, 35%, 40%, or 50% of all amine groups of the polycationic segments. In particular embodiments, the proportion of selectively bound amine groups of the polycationic segments (e.g., polycationic segments with a particular degree of branching such as less than about 0.33, or other ranges disclosed herein) can be between about 10% and about 40%, or between about 15% and about 35%, of all the amine groups of the polycationic segments. Selected substituents can include a variety of substituents. In some embodiments, the selected substituents are silicone segments, hydrophilic segments, other substituents as described herein (e.g., UV blockers, dyes, deposition agents, etc.) and/or known to those skilled in the art, or any combination of such substituents. In some particular embodiments, the selected substituents include at least one of silicone segments and hydrophilic segments.

In some embodiments, a copolymer can include a plurality of free amines, preferably primary and/or secondary amines, for associating with particular molecular species. For example, the polycationic segments of a copolymer can have free amines (e.g., polyalkyleneimine segments with secondary amines in the backbone). When a free amine is present in a copolymer that is deposited onto a fibrous substrate, such as a textile, the amine can serve as and odor absorber (e.g., absorbing body odor agent). Accordingly, some embodiments can include a copolymer that additionally acts as an odor absorber.

Some of the copolymers described herein can be formed from a single step synthesis. For example, polycationic polymers corresponding to the polycationic segments can be mixed with silicone polymers corresponding to the silicone segments in a single vessel to form the copolymer molecules. In some instances, some or all of the precursors are commercially available materials. In addition, other components such hydrophilic polymers corresponding to any of the hydrophilic segments disclosed herein and/or UV blockers, dyes, and other materials can also be added to a single vessel. Accordingly, embodiments of the invention can include a mixture of the precursors that will eventually form any of the copolymers of the present application, or intermediate copolymers thereof. Alternatively, separate steps can also be utilized if desired. Those skilled in the art will readily appreciate modifications in these steps to form the copolymers of the present application. Such modifications are all within the scope of the present application.

Copolymer Dispersion Properties

In accord with embodiments of the invention disclosed herein, the copolymers discussed herein can be formulated to be dispersible in an aqueous solution, a non-aqueous solution, or a mixture of aqueous and non-aqueous solutions. For example, copolymers having a plurality of polycationic segments and silicone segments can be dispersible in aqueous solutions, non-aqueous solutions, or a combination of both. In some embodiments, such copolymers do not require the presence of a hydrophilic segment for dispersibility in non-aqueous solutions or solutions formed from a mixture of aqueous and non-aqueous dispersions (e.g., aqueous solution with isopropyl alcohol and/or acetone); these copolymers can be utilized in particular treatment compositions such as dry cleaning treatments, some types of spray treatments, or other treatments that are typically applied by a manufacturer. These copolymers can also be dispersed in an aqueous solution which has been acidified to add charge on the polymer and enhance aqueous solution dispersibility. For example, a copolymer solution with less than about 2% (w/v) of copolymer can be acidified to a level with a pH less than about 9 to allow dispersal of a copolymer having substantially linear polycationic segments such as polyethyleneimine. Copolymers with a plurality of polycationic segments, silicone segments, and hydrophilic segments can be dispersed in aqueous solutions. Without being bound by theory, it is believed that the presence of hydrophilic segments can help improve the copolymer's dispersibility in aqueous environments.

Though polymer mixtures having any of the copolymers disclosed herein can have a variety of concentrations and concentration ranges, in some embodiments a range of concentration is selected to allow the copolymer to be dispersed in a dispersion medium. For example, when the copolymer can be stored as a gelled material in some instances, it can be advantageous to limit the concentration of the copolymer in a dispersion medium such that dilution of the copolymer to form a non-gelled solution can be performed without substantial undue effort. In some examples, the polymer mixture can have a concentration of copolymer less than about 50%, or less than about 40%, or less than about 30% by weight. As well, the concentration range of a mixture can be chosen to provide sufficient copolymer to allow the copolymer to be applied to a substrate and impart or maintain a property (e.g., oil repellency and/or water repellency). For instance, if the copolymer concentration of the treatment solution is too low, oil repellency properties can decrease though water repellency properties are maintained. The polymer mixture can have a concentration of copolymer greater than about 1 part per million, or greater than about 1 part per 100,000, or greater than about 1 part per 1,000 by weight. In some embodiments, the concentration of copolymer in a polymer mixture can be in a range between about 1 part per million and about 50% by weight, or between about 1 part per million and about 40% by weight.

In some embodiments, a polymer mixture having a copolymer, as disclosed herein, is prepared such that the copolymer does not form a gel in the mixture. Such non-gelled polymer solutions can be utilized to apply the copolymer to a fibrous substrate by contacting the solution to the fibrous material; the solid-like properties of gelled materials can substantially hinder copolymer delivery to the fibrous substrate. In some embodiments, the polymer mixture can have a concentration such that the copolymer does not form a gel, and can exhaust from the non-gelled solution readily for application to a substrate. For instance, the concentration of copolymer can be just below the gelation point (e.g., less than about 5%, or less than about 2%, or less than about 1% by weight of the solution). In some embodiments, the concentration of a copolymer (e.g., having polyethyleneimine segments connected by silicone segments and polyalkylene oxide segments) is about 0.5% to about 2% by weight of the solution.

The various copolymers disclosed herein can be utilized with other components to provide a treatment composition for a fibrous material or substrate. Such a treatment can impart and/or maintain a level of oil repellency and/or water repellency to the treated fibrous substrate.

Accordingly, the copolymer can be utilized as a component of a textile treatment composition for imparting and/or maintaining a level of oil repellency and/or water repellency. The textile treatment composition can additionally be a laundry detergent or other cleaning composition, repellency treatment composition, or a fabric softener. In such a capacity, the textile treatment composition can include one or more additional components to impart additional properties to treated textiles or the composition. Such components can include UV blockers, dyes, optical brightening agents, thickeners, deposition agents, fabric cleansing agents, hindered amine light stabilizers, and fragrance materials. For instance, a laundry detergent would include a fabric cleansing agent as a component, such as various types of surfactants. These components include the range of such materials as known to those skilled in the art. Types of UV blockers that can be utilized include cinnamic acid, vanillin, benzophenone, benzotraizole, and hydroxyphynyl triazine. Non-limiting examples of dyes include textile dyes, food dyes, and reactive dyes. Optical brightening agents, such as fluorescent whitening agents, are commercially available from manufacturers (e.g., Ciba®, Uvitex®, OB, and Durawhite from Town End). Thickeners that can be utilized include polymers such as cellulosics and/or polysaccharides. Deposition aids generally include materials which can aid in putting the copolymer on a substrate surface (e.g., other polycations). In general, components can be added to the treatment composition as separate components that are not directly bonded to the copolymer.

Any one of the additional components can be attached to the copolymer directly, which can potentially aid in the component's delivery and/or substantivity to the textile or fibrous material. In some embodiments, one or more of the additional components are bound to a portion of the polycationic segment such as an amine group of a polycationic segment. In some particular embodiments, the polycationic segments can include a repeat unit having Structural Formula (Ib):

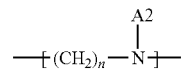

(Ib)

where n is an integer between about 2 and about 10; or between about 2 and about 5; or n is 2. A2 can be an additional component that enhances a treatment composition without significantly affecting the oil repellency and/or water repellency imparted by the copolymer. In some embodiments, A2 can be at least one of a UV blocker, a dye, an optical brightening agent, a thickener, a deposition agent, a hindered amine light stabilizer, and a fragrance material. In other embodiments, A2 is at least one of a UV blocker, a dye, a thickener, and a deposition agent.

Other treatment compositions include those formulated to impart stain repellency to paper-based materials. The copolymers disclosed herein can be included in the treatment compositions to provide stain repellency to the paper-based material by affinity with fibers such as cellulose. Such affinity can be achieved by the electrostatic interactions between the polycationic segments and the fibers of the paper, and/or by the use of a crosslinking agent, as previously described, to form covalent bonds to bind the copolymer to the paper fibers. As well, the paper treating composition can include additional components as previously discussed (e.g., a dye), which can be bonded to a portion of the copolymer, or simply mixed as a separate component. For example, the copolymer can be bonded to a polycationic segment, such as described above with respect to Structural Formula (Ib). In some instances, A2 can be selected to be a component appropriate for paper-based materials.

Other embodiments are directed to substrates, such as fibrous materials, that have been treated with a composition. In general, the composition includes at least one of the copolymers disclosed within the present application. An example of such treated fibrous materials include a treated textile. The treated textile can have improved oil repellency and/or water repellency relative to the untreated textile. Another example is a treated paper-based material. The paper-based material can have improved stain resistant properties relative to the untreated material. The composition, which contacts the fibrous material, can also include any of the other components (e.g., UV blockers, optical brightening agents, etc.) disclosed herein.

Those skilled in the art will readily appreciate that treated substrates and treatment compositions for substrates can be formulated beyond the specific examples discussed herein (i.e., the treated substrate and/or treatment composition can be formulated for materials beyond textiles and paper-based materials). For example, other synthetic or natural substrates can potentially benefit from application of the copolymers discussed herein such as other cellulose based materials. It is understood that such substrates, and compositions for such substrates, are all within the scope of the present application.

Methods for Modifying Oil Repellency and/or Water Repellency

Some embodiments are directed to methods of using any of the copolymers revealed within the present application. For instance, one embodiment is generally directed to a method for imparting oil repellency, water repellency, or both to a fibrous material such as a textile or a paper-based material. The phrase "imparting at least one of water repellency and oil repellency" is meant to include causing an improvement, or maintaining a particular level of, water repellency and/or oil repellency. Such a method includes a step of applying a copolymer to a fibrous material to impart water and/or oil repellency. The copolymers that can be utilized include one or more of the copolymers disclosed in the present application. For example, the copolymer can comprise a plurality of polycationic segments and silicone segments, or a plurality of polycationic segments, silicone segments, and hydrophilic segments as described within the present application.

Application of the copolymer can be performed in a variety of manners. In some embodiments, the copolymer can be a portion of a polymer mixture such as a non-gelled polymer solution. The dispersion media can be aqueous (e.g., acidified aqueous), non-aqueous, or a mixture of both. The fibrous material can be contacted with the polymer mixture (e.g., immersion, spraying, or other technique of solution/substrate contact), which can apply the copolymer to the fibrous material. Such mixtures can have any of the properties disclosed for copolymer mixtures herein. The copolymer can adhere to the fibrous material through a variety of interactions such as electrostatic attraction or by covalent bonding to the fibers. In the latter instance, a crosslinking agent can be added to the polymer solution, or applied to the fibrous material after contacting the polymer solution with the fibrous material, to initiate bonding with the copolymer.

In other embodiments, the copolymer is applied to a fibrous material by forming the copolymer in the presence of the fibrous material. For instance, a plurality of polycations can be applied to the fibrous substrate. Such polycations can include any of the polycations disclosed herein for use with the copolymers. A mixture of silicone polymers can be subsequently introduced. The silicone polymers can have any of the properties disclosed for silicone segments herein (e.g., each silicone polymer having one, two, or more functionalities for reacting with an amine group to attach to a polycation). Each silicone polymer can react and attach to a polycation to help form the copolymer. In some cases, heat can be applied to induce the copolymer formation (e.g., heating one or more of the mixtures and/or the fibrous material).

Copolymer formation in the vicinity of a fibrous material can be associated with potential advantages. For instance, forming a branched copolymer on the surface of the fibrous material can help alleviate the labor associated with processing highly-branched, high molecular weight polymer mixtures, which can have a tendency to gel. Polymer solutions with the polycations, and/or polymer solutions with the silicones can potentially be easier to handle, and may avoid the complications of needing to utilize a polymer solution that is close to its gel point. In another instance, copolymer formation in the vicinity of a fibrous material can ease the use of particular copolymer compositions. For example, copolymers that include branched polycationic segments can be difficult to apply as the copolymer molecule to a fibrous material due to effects such as potential decreased affinity relative to using more linear polycationic segments in a formed copolymer. By applying the branched polycations first (e.g., branched polyethyleneimine) and then reacting with other segments to form the copolymer, the application of such copolymers can be performed more readily.

Potentially, any of the copolymers disclosed in the present application can be formed in the presence of a fibrous material. For example, the copolymer can also include hydrophilic segments, such as any of the types disclosed herein (e.g., with amine reacting functionalities). The hydrophilic segments can be formed from corresponding hydrophilic polymers that can be part of the silicone polymer mixture, or applied as a separate mixture. As well, other components such as UV blockers, optical enhancing agents, thickeners, etc., can be added (e.g., with any of the previously mentioned mixtures, or as one or more other separate mixtures). As well, a crosslinking agent can be added after polycationic application, or copolymer formation, to covalently bond the copolymer to the fibrous material.

Those skilled in the art will readily appreciate that any number of additional steps, and the order in which the steps are carried out, can be modified within the scope of the methods disclosed herein. All such alterations are within the scope of the present application.

EXAMPLES

The following examples are provided to illustrate some aspects of the present application. The examples, however, are not meant to limit the practice of any embodiment of the invention.

Synthesis Procedures

Synthesis 1: "Linear" Polyethyleneimine ("LPEI")

Poly (2-ethyl-2-oxazoline) (Sigma Aldrich, St. Louis, Mo.; catalog no. 373974) was deacetylated by refluxing in 6M HCl overnight to yield a LPEI with a molecular weight of about 215,000 Daltons.

Synthesis 2: LPEI/PDMS Copolymer

Poly(dimethylsiloxane) ("PDMS"), having a molecular weight of about 980 Daltons and being diglycidyl ether terminated (Sigmal Aldrich, St. Louis, Mo.; catalog no. 480282), was mixed with LPEI, produced using Synthesis 1, in a thick-walled glass flask with isopropyl alcohol ("IPA"). The amounts of each component for making Sample A1 are shown in Table 1. The flask was heated to 150° C. and kept at that temperature for 18 hours. The resulting polymer solution was then concentrated to 20% (w/v) using a Roto-Vap.

TABLE 1

| Sample | Si 1K Di (g) | LPEI (g) | IPA (mL) |
|--------|--------------|----------|----------|
| A1     | 4.20         | 1.80     | 200.0    |

Synthesis 3: LPEI/PPO/PDMS Copolymer

Samples B1-B10 of LPEI/PPO/PDMS copolymer were prepared from starting materials as listed in Table 2. For each sample, LPEI and PDMS, as described for Synthesis 2, were mixed with poly(propylene glycol) ("PPO"), having a molecular weight of about 640 Daltons and being diglycidyl ether terminated (Sigma Aldrich, St. Louis, Mo.; catalog no. 406740), in a thick-walled glass flask with IPA. The flask was heated to 150° C. and kept at that temperature for 18 hours. The resulting polymer solution was then concentrated to 20% (w/v) using a Roto-Vap.

TABLE 2

| Sample | LPEI (g) | Si 1K Di g) | PPO (g) | IPA (mL) |
| --- | --- | --- | --- | --- |
| B1 | 0.9 | 2.1 | 0.64 | 121.3 |
| B2 | 1.0 | 1.6 | 0.52 | 104.0 |
| B3 | 1.0 | 0.8 | 1.00 | 93.3 |
| B4 | 0.9 | 1.1 | 0.72 | 90.7 |
| B5 | 0.65 | 0.75 | 0.95 | 78.3 |
| B6 | 1.05 | 0.6 | 1.20 | 95.0 |
| B7 | 1.8 | 4.0 | 0.20 | 200.0 |
| B8 | 1.8 | 3.8 | 0.40 | 200.0 |
| B9 | 1.8 | 4.1 | 0.10 | 200.0 |
| B10 | 1.8 | 4.15 | 0.05 | 200.0 |

Synthesis 4: LPEI/PEG/PDMS Copolymer

Samples C1-C6 of LPEI/PEG/PDMS copolymer were produced from starting materials as listed in Table 3. For each sample, LPEI and PDMS, as described for Synthesis 2, were mixed with poly(ethylene glycol) ("PEG"), having a molecular weight of about 526 Daltons and being diglycidyl ether terminated (Sigma Aldrich, St. Louis, Mo.; catalog no. 475696), in a thick-walled glass flask with IPA. The flask was heated to 150° C. and kept at that temperature for 18 hours. The resulting polymer solution was then concentrated to 20% (w/v) using a Roto-Vap.

TABLE 3

| Sample | Si 1K Di (g) | PEG (g) | LPEI (g) | IPA (mL) |
| --- | --- | --- | --- | --- |
| C1 | 2.10 | 0.53 | 0.90 | 117.5 |
| C2 | 1.20 | 1.00 | 0.90 | 103.3 |
| C3 | 1.80 | 0.80 | 0.90 | 116.7 |
| C4 | 1.60 | 0.42 | 1.00 | 100.7 |
| C5 | 2.40 | 0.52 | 1.40 | 144.0 |
| C6 | 1.91 | 0.51 | 1.00 | 114.0 |

Synthesis 5: LPEI/PPO/Bifunctional and Monofunctional Silicone Copolymer

Copolymer samples D1 and D2 were produced from starting materials as listed in Table 4. For each sample, LPEI, PPO, and PDMS, as described in Synthesis 3, were mixed with two other types of PDMS: an epoxypropoxypropyl, mono-terminated PDMS having a molecular weight of about 5,000 Daltons (Gelest, Morrisville, Pa.; #DMS-E21); and a chloromethyl, di-terminated PDMS having a molecular weight of about 7,000 Daltons (Gelest, Morrisville, Pa.; #DMS-L21). The components were combined with IPA in a thick-walled glass flask that was heated to 150° C. and kept at that temperature for 18 hours. The resulting polymer solution was then concentrated to 20% (w/v) using a Roto-Vap.

TABLE 4

| Sample | Si 5K (g) | Si 1K Di (g) | Si 7K Di (g) | PPO (g) | LPEI (g) | IPA (mL) |
| --- | --- | --- | --- | --- | --- | --- |
| D1 | 1.70 | 1.50 | 1.00 | 0.20 | 1.80 | 206.7 |
| D2 | 2.89 | 3.80 | 1.70 | 0.40 | 1.80 | 353.0 |

Synthesis 6: Polyethyleneimine/PPO/PDMS Copolymer

PPO and PDMS, as described in Synthesis 3, were mixed with a branched polyethyleneimine having a molecular weight of about 750,000 Daltons (Sigma Aldrich, St. Louis, Mo.; catalog no. 181978). The branched polyethyleneimine has approximately 25% primary amines, 50% secondary amines, and 25% tertiary amines. The components were combined with IPA in a thick-walled glass flask that was heated to 150° C. and kept at that temperature for 18 hours. The resulting polymer solution was then concentrated to 20% (w/v) using a Roto-Vap. Sample E1 was produced using the amounts of starting materials listed in Table 5; the weight of the polymer was calculated on the a basis of the supplied solution (50% in water).

TABLE 5

| Sample | Si 1K Di (g) | PPO (g) | BPEI (g) | IPA (mL) |
| --- | --- | --- | --- | --- |
| E1 | 1.70 | 0.05 | 0.90 | 88.3 |

Synthesis 7: PVA/PPO/PDMS Copolymer

PPO and PDMS, as described in Synthesis 3, were mixed with a polyvinyl amine ("PVA") having a molecular weight of about 350,000 Daltons (BASF Product Lupamin 9095). The components were combined in a thick-walled glass flask with IPA that was heated to 150° C. and kept at that temperature for 18 hours. The resulting polymer solution was then concentrated to 20% (w/v) using a Roto-Vap. Sample F1 was produced using the amounts of starting materials as listed in Table 6; the weight of the polymer was calculated on the a basis of the supplied solution.

TABLE 6

| Sample | PVA (g) | Si 1K Di (g) | PPO (g) | IPA (mL) |
| --- | --- | --- | --- | --- |
| F1 | 0.90 | 2.04 | 0.05 | 99.7 |

Application of Samples to Fiber Surfaces

The samples of 20% polymer/IPA solutions were each diluted with deionized water to yield a 5000 ppm solution and a 1000 ppm solution (a solution of each concentration was made for each polymer sample). Swatches of cotton, poly/cotton blend, polyester, and wool were dipped into each of the polymer solutions for 5 minutes and then dried in a 105° C. oven. Separate swatches were also rinsed for 2 minutes in deionized water after the polymer treatment to test the effect of rinsing. Rinsing did not affect the outcome of the experiments. Also, similar effects were seen at each concentration. After the drying step, the oil and water repellency of the treated fabric was tested by putting either a drop of deionized water or a drop of mineral or vegetable oil onto the fabric.

All of the swatches treated using polymer solutions from sample sets A, B, and C repelled oil and water. Sample A was not soluble in water unless the water was first acidified. Acidification was achieved by adding two drops (approximately 100 μL) of 0.1 HCl for 1000 ppm solutions, and adding four drops (approximately 200 μL) of 0.1 HCl for 5000 ppm solutions.

Swatches treated using polymer solutions in sample set D showed excellent water repellency but limited oil repellency; the oil drop beaded at first but sank into fabric thereafter. The treated swatches had excellent softness.

Swatches treated with the polymer solution of sample E1 showed water and oil repellency, but not to the same degree as swatches treated with solutions from sample sets A, B, or C. Swatches treated with the polymer solution of sample F1 showed water and oil repellency, but not to the same degree as swatches treated with solutions from sample sets A, B, or C.

While the present invention has been described in terms of specific methods, structures, and devices it is understood that variations and modifications will occur to those skilled in the art upon consideration of the present application. As well, the features illustrated or described in connection with one embodiment may be combined with the features of other embodiments. For example, particular copolymer portions in one embodiment can be combined with one or more copolymer portions of another embodiment. Such modifications and variations are intended to be included within the scope of the present invention. Those skilled in the art will appreciate, or be able to ascertain using no more than routine experimentation, further features and advantages of the invention based on the above-described embodiments. Accordingly, the invention is not to be limited by what has been particularly shown and described, except as indicated by the appended claims. All publications and references are herein expressly incorporated by reference in their entirety.

What is claimed is:

1. A copolymer for imparting at least one of oil repellency and water repellency to a fibrous material, comprising:
    a plurality of aliphatic amine polymer segments, each segment including a plurality of repeat units, each unit including at least one amine group; and
    a first plurality of silicone segments, each segment being attached to at least two amine groups, each amine group being a part of a distinct aliphatic amine polymer segment.

2. The copolymer of claim 1, wherein the plurality of aliphatic amine polymer segments include at least one of polyalkyleneimine, polyvinylamine, polyallylamine, polydiallylamine, and copolymers thereof.

3. The copolymer of claim 1, wherein the plurality of aliphatic amine polymer segments have an average molecular weight greater than about 100,000 Daltons.

4. The copolymer of claim 1, wherein the plurality of aliphatic amine polymer segments include a polyalkyleneimine segment comprising a repeat unit represented by Structural Formula (Ia):

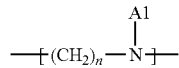

wherein n is an integer from about 2 to about 10; and A1 is at least one of a hydrogen atom or a silicone segment.

5. The copolymer of claim 4, wherein the polyalkyleneimine segment further comprises another repeat unit represented by Structural Formula (Ib):

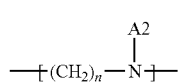

wherein n is an integer from about 2 to about 10; and A2 is at least one of a UV blocker, a dye, an optical brightening agent, a thickener, a deposition agent, a hindered amine light stabilizer, and a fragrance material.

6. The copolymer of claim 1, wherein the aliphatic amine polymer segments include a polyalkyleneimine segment with a degree of branching smaller than about 0.33.

7. The copolymer of claim 1, wherein the aliphatic amine polymer segments include polyalkyleneimine segments having an average molecular weight between about 100,000 Daltons and about 2,000,000 Daltons.

8. The copolymer of claim 1, wherein the copolymer has a molecular weight of greater than about 200,000 Daltons.

9. The copolymer of claim 1, wherein the first plurality of silicone segments include a polymer segment having a repeat unit represented by Structural Formula (II):

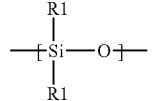

wherein each R1 group is independently a hydrocarbyl group containing 1 to 6 carbon atoms, a hydrogen, or a hydroxyl group.

10. The copolymer of claim 1, wherein the first plurality of silicone segments have an average molecular weight between about 500 Daltons and about 10,000 Daltons.

11. The copolymer of claim 1, wherein the copolymer is substantially fluorine free.

12. The copolymer of claim 1, further comprising:
    a plurality of softening segments for imparting softness to a textile material when the copolymer is applied to the textile, wherein each of the plurality of softening segments is attached to only one aliphatic amine polymer segment.

13. The copolymer of claim 12, wherein the plurality of softening segments include a second plurality of silicone segments.

14. The copolymer of claim 1, wherein a range of about 10% to about 40% of all amine groups of the plurality of aliphatic amine polymer segments are attached to the first plurality of silicone segments.

15. A treated fibrous material comprising:
    a fibrous material; and
    a composition including the copolymer of claim 1, the composition contacting a surface of the fibrous material.

16. The treated fibrous material of claim 15, wherein the fibrous material is at least one of a textile material and a paper-based material.

17. A copolymer for imparting at least one of water repellency and oil repellency to a fibrous material, comprising:
    a plurality of polycationic segments, each segment including a plurality of repeat units, each unit including at least one amine group;
    a first plurality of silicone segments, each silicone segment being attached to at least one amine group of any of the plurality of polycationic segments; and
    a plurality of hydrophilic segments, each hydrophilic segment being attached to at least one amine group of any of the plurality of polycationic segments.

18. The copolymer of claim 17, wherein each of the first plurality of silicone segments is attached to at least two amine groups, each amine group being part of a distinct polycationic segment.

19. The copolymer of claim 17, wherein the plurality of polycationic segments include aliphatic amine polymer segments.

20. The copolymer of claim 19, wherein the aliphatic amine polymer segments include at least one of polyalkyleneimine, polyvinylamine, polyallylamine, polydiallylamine, and copolymers thereof.

21. The copolymer of claim 20, wherein the aliphatic amine polymer segments include polyalkyleneimine segments having an average molecular weight between about 10,000 Daltons and about 2,000,000 Daltons.

22. A fibrous-substrate-treating composition comprising a polymer mixture including the copolymer of claim 17, wherein a concentration of the copolymer is in a range from about 1 part per million to about 40% by weight of the composition.

23. A fibrous-substrate-treating composition comprising a polymer mixture including the copolymer of claim 17 and at least one of a UV blocker, a dye, an optical brightening agent, a thickener, a deposition agent, a hindered amine light stabilizer, and a fragrance material.

24. A fibrous-substrate-treating composition comprising a polymer mixture including the copolymer of claim 17, wherein the composition includes a cleansing agent for cleaning a textile material.

25. The copolymer of claim 17, wherein the first plurality of silicone segments include a polymer segment having a repeat unit represented by Structural Formula (II):

(II)

wherein each R1 group is independently a hydrocarbyl group containing 1 to 10 carbon atoms, a hydrogen, or a hydroxyl group.

26. The copolymer of claim 17, wherein the first plurality of silicone segments have an average molecular weight between about 500 Daltons and about 10,000 Daltons.

27. The copolymer of claim 17, further comprising:
a plurality of softening segments for imparting softness to a textile material when the copolymer is applied to the textile, wherein each of the plurality of softening segments is attached to only one polycationic segment.

28. The copolymer of claim 17, wherein a range of about 10% to about 40% of all amine groups of the plurality of polycationic segments are attached to at least one of the first plurality of silicone segments and the plurality of hydrophilic segments.

29. A method for imparting at least one of water repellency and oil repellency to a fibrous material, comprising:
applying the copolymer of claim 1 to the fibrous material to impart at least one of water repellency and oil repellency to the fibrous material.

30. A treated fibrous material comprising:
a fibrous material; and
a composition including the copolymer of claim 17, the composition contacting a surface of the fibrous material.

31. A method for imparting at least one of water repellency and oil repellency to a fibrous material, comprising:
applying the copolymer of claim 17 to the fibrous material to impart at least one of water repellency and oil repellency to the fibrous material.

\* \* \* \* \*